June 29, 1965 L. A. BALZ 3,191,351
ICE DRILL SHARPENER
Filed April 29, 1963
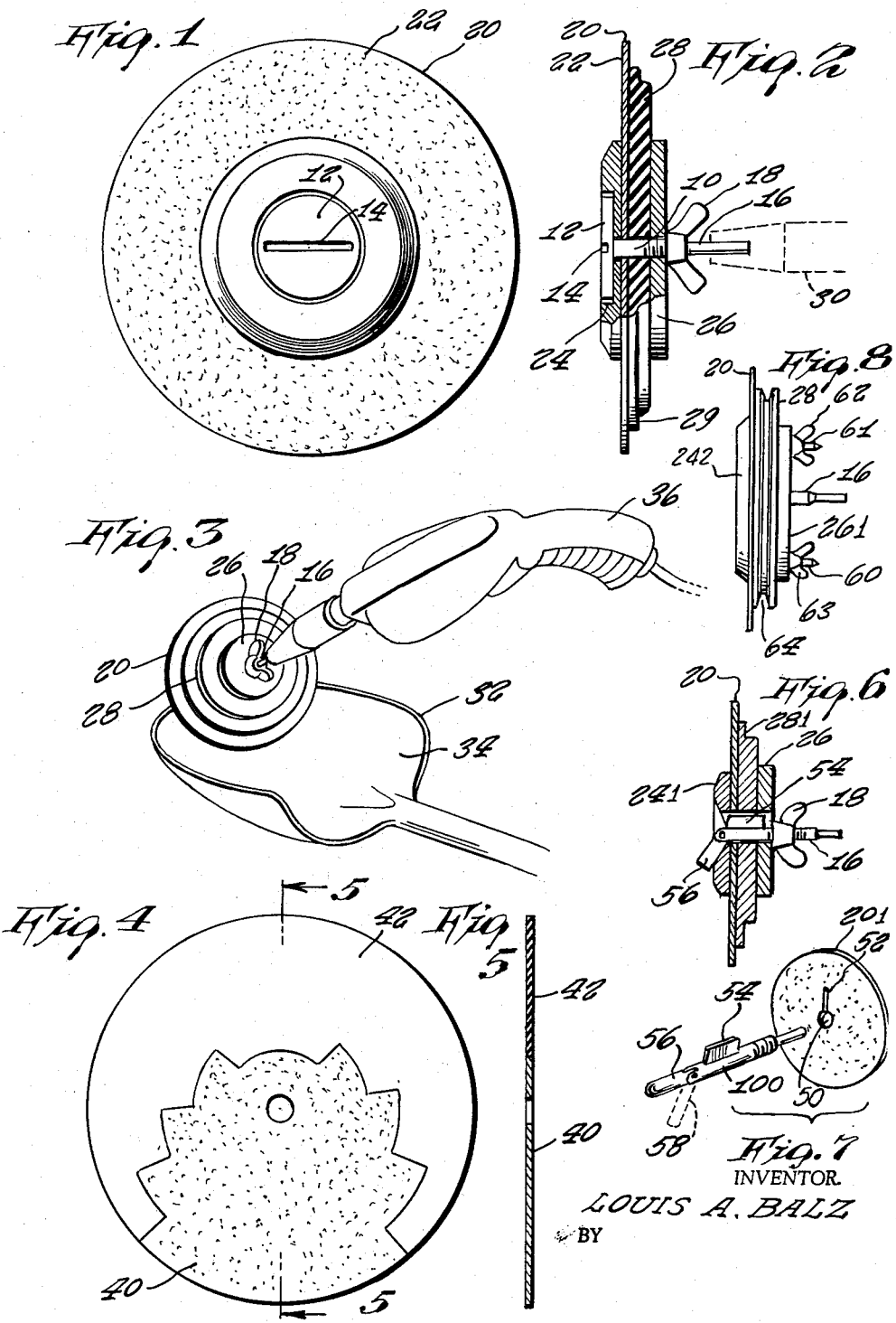
INVENTOR.
LOUIS A. BALZ
BY United States Patent Office 3,191,351
Patented June 29, 1965

3,191,351
ICE DRILL SHARPENER
Louis A. Balz, 123 N. 3rd Ave., Wausau, Wis.
Filed Apr. 29, 1963, Ser. No. 276,376
1 Claim. (Cl. 51—358)

My invention is directed toward ice drill sharpeners and buffers.

It is an object of my invention to provide a new and improved ice drill sharpener and buffer.

Another object of my invention is to provide a new and improved sharpener and buffer of the character indicated, which can be easily attached to an electric drill and easily manipulated in use.

Still another object is to provide a new and improved ice drill sharpener and buffer which can be easily manufactured at low cost.

All of the foregoing and still further objects and advantages of my invention will become apparent when this specification is studied together with the accompanying drawing, wherein:

FIGURE 1 is a front view of my invention as assembled;

FIGURE 2 is a side view thereof partially in cross-section;

FIGURE 3 is a perspective view showing my invention in use;

FIGURE 4 is a modified form of my invention;

FIGURE 5 is a cross section through 5—5 in FIGURE 4;

FIGURE 6 is a modified form of my invention shown in a side cross-sectional view; and FIGURE 7 is a detail view of some of the elements in FIGURE 6.

FIGURE 8 is a side elevation of another modification of my invention.

Referring to FIGURES 1–3, one end of pan arbor 10 has a head plate 12 with a screw driver slot 14 and the other end has a spindle 16 projecting therefrom. A wing nut 18 threadedly engages a central portion of arbor 10.

Interposed between plate 12 and nut 18 is a circular flexible sheet 20 having a layer 22 of abrasive material on one side, sheet 20 having a central hole through which arbor 10 extends.

A circular front plate 24 and a circular backing plate 26 are disposed on opposite sides of sheet 20, and a flexible rubber disc 28 is interposed between the backing plate 26 and sheet 20. Disc 28 has a peripheral feathered edge 29. All of the foregoing have circular holes through which arbor 10 extends, plate 12 holding plate 24 in place and nut 18 holding the entire assembly together.

When spindle 16 is clamped in the chuck 30 of an electric drill 36, my invention can be used to sharpen or buff the edge 32 of an ice drill 34, as shown in FIGURE 3.

As shown in FIGURES 4 and 5, sheet 20 can be a composite having a leaf-shaped portion 40 of its working surface carrying abrasive material, surrounded by the remaining portion 42 of this surface which is smooth for buffing.

As shown in FIGURES 6 and 7, sheet 201 can have a slot 52 extending away from its central hole 50, arbor 100 carrying a keying member 54 which fits into slot 52. Moreover, the end of arbor 101 remote from nut 18 no longer terminates in head plate 12, but rather terminates in an extension 56 pivotally secured thereto. As spindle 16 is rotated, extension 56, due to forces of rotation, assumes a locking position as shown in FIGURE 6, and in dotted line 58 in FIGURE 7.

In the modification as shown in FIGURE 8, the spindle 16 is threaded at its inner end to the circular front plate 242. The flexible disc 20, rubber disc 28, and the circular backing plate 261, have aligned central perforations through which spindle 16 extends in a fashion similar to the modification shown in FIGURE 2. In addition, sharply pointed studs 60 and 61 are threadedly connected to the circular front plate 242. The sharp points on the said studs are used to pierce through the abrasion material of sheet 20, and pass through aligned holes in the rubber disc 28 and backing plate 261. Wing nuts 62 and 63 are then threadedly mounted on the said studs to bear against backing plate 261, thereby holding the assembly together. It is to be further noted that in the modification of FIGURE 8, the rubber or flexible disc 28 includes a peripheral groove 64 formed between the end surfaces of the said disc in a substantial symmetrical fashion providing an efficient flexible supporting means for the abrasive material of sheet 20.

While I have described my invention with particular reference to the drawings, my protection is to be limited only by the terms of the claim which follows.

I claim as follows:

An ice drill sharpener including a flexible disc having one surface at least partially coated with abrasive material and having a central hole and a short radial slot communicating with said hole, the total length of the slot being substantially less than the radius of said disc, an arbor extending through said hoe, the arbor carrying a keying member in keying engagement with said slot, and an extension member pivotally secured at one end to one end of said arbor.

References Cited by the Examiner
UNITED STATES PATENTS

| | | | |
|---|---|---|---|
| 1,709,820 | 4/29 | Gammeter | 51—209 XR |
| 2,229,745 | 1/41 | Kneisley | 51—170 |
| 2,822,648 | 2/58 | Metzger et al. | 51—168 |

LESTER M. SWINGLE, Primary Examiner.

J. SPENCER OVERHOLSER, Examiner.